United States Patent
de Waal et al.

(10) Patent No.: US 7,576,745 B1
(45) Date of Patent: Aug. 18, 2009

(54) CONNECTING GRAPHICS ADAPTERS

(75) Inventors: Abraham B. de Waal, San Jose, CA (US); Anthony M. Tamasi, San Jose, CA (US); Ross F. Jatou, San Jose, CA (US); Ludger Mimberg, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 319 days.

(21) Appl. No.: 10/990,721

(22) Filed: Nov. 17, 2004

(51) Int. Cl.
*G06F 15/00* (2006.01)
*G06T 1/00* (2006.01)
*G06F 15/16* (2006.01)
*G06F 15/80* (2006.01)
*G06F 13/14* (2006.01)
*G06F 13/00* (2006.01)
*H05K 7/10* (2006.01)

(52) U.S. Cl. .................. 345/502; 345/501; 345/503; 345/505; 345/519; 345/520; 710/100; 710/301

(58) Field of Classification Search ............. 345/505, 345/520, 426, 502, 101, 503, 501, 519; 710/100, 710/301
See application file for complete search history.

(56) References Cited

U.S. PATENT DOCUMENTS

| | | |
|---|---|---|
| 5,448,655 A | 9/1995 | Yamaguchi |
| 5,502,808 A | 3/1996 | Goddard et al. |
| 5,522,027 A | 5/1996 | Matsumoto et al. |
| 5,784,628 A | 7/1998 | Reneris |
| 5,794,016 A | 8/1998 | Kelleher |
| 6,191,800 B1 | 2/2001 | Arenburg et al. |
| 6,329,996 B1 | 12/2001 | Bowen et al. |
| 6,473,086 B1 * | 10/2002 | Morein et al. ............. 345/505 |
| 6,501,999 B1 | 12/2002 | Cai |
| 6,535,939 B1 | 3/2003 | Arimilli et al. |
| 6,631,474 B1 | 10/2003 | Cai et al. |
| 6,633,296 B1 | 10/2003 | Laksono et al. |
| 6,683,614 B2 | 1/2004 | Walls et al. |

(Continued)

FOREIGN PATENT DOCUMENTS

EP 0428277 5/1991

(Continued)

OTHER PUBLICATIONS

"Alienware Announces Video Array and X2: An Exclusive Advancement in PC Graphics Technology", Alienware, May 12, 2004, <http://www.alienware.com/press_release_pages/press_release_template.aspx?FileName=press051204.asp>.

(Continued)

*Primary Examiner*—Kee M Tung
*Assistant Examiner*—Jacinta Crawford
(74) *Attorney, Agent, or Firm*—Patterson & Sheridan, LLP (57) ABSTRACT

A system and method for providing a dedicated interface between two or more graphics adapters installed on a motherboard. Surplus signals within an interface conforming to an interface specification are used to create the dedicated interface. The dedicated interface may connect the two or more graphics adapters using connectors via an interface device. Alternatively the dedicated interface may directly connect the two or more graphics adapters using dedicated connectors or a portion of the connectors coupled through conductive traces integrated onto the motherboard.

27 Claims, 10 Drawing Sheets

U.S. PATENT DOCUMENTS

| | | |
|---|---|---|
| 6,711,638 B1 | 3/2004 | Wu |
| 6,750,870 B2 | 6/2004 | Olarig |
| 6,760,031 B1 | 7/2004 | Langendorf et al. |
| 6,882,346 B1 | 4/2005 | Lefebvre et al. |
| 6,919,896 B2 | 7/2005 | Sasaki et al. |
| 7,030,837 B1 | 4/2006 | Vong et al. |
| 7,176,847 B2 | 2/2007 | Loh |
| 7,184,003 B2 | 2/2007 | Cupps et al. |
| 2002/0047851 A1 | 4/2002 | Hirase et al. |
| 2002/0118201 A1 | 8/2002 | Mukherjee et al. |
| 2003/0128216 A1 | 7/2003 | Walls et al. |
| 2003/0137483 A1 | 7/2003 | Callway |
| 2004/0104913 A1 | 6/2004 | Walls et al. |
| 2005/0017980 A1* | 1/2005 | Chang et al. ............... 345/520 |
| 2005/0088445 A1* | 4/2005 | Gonzalez et al. ............ 345/502 |
| 2005/0134588 A1* | 6/2005 | Aila et al. .................. 345/426 |
| 2005/0160212 A1* | 7/2005 | Caruk ........................ 710/301 |
| 2005/0278559 A1 | 12/2005 | Sutardja et al. |

FOREIGN PATENT DOCUMENTS

| | | |
|---|---|---|
| EP | 0571969 A2 | 12/1993 |
| FR | 2834097 A1 | 6/2003 |
| FR | 2839563 A1 | 11/2003 |
| JP | 5324583 A | 12/1993 |
| TW | 328392 | 3/1998 |
| TW | 570243 | 1/2004 |
| WO | WO 03/083636 A1 | 10/2003 |

OTHER PUBLICATIONS

"Alienware Promises Fastest Graphics Solution", Alienware, Jun. 28, 2004, <http://www.alienware.com/press_release_pages/press_release_template.aspx?FileName=press062804.asp>.

"Frequently Asked Questions", Alienware, Oct. 22, 2004, <http://www.alienware.com/alx_pages/main_content.aspx>.

Whitman, Scott, "Dynamic Load Balancing for Parallel Polygon Rendering," IEEE Computer Graphics and Applications, IEEE Inc., New York, vol. 14, No. 4, Jul. 1, 1994.

Henry Fuchs, Distributing a visible surface algorithm over multiple processors, Proceedings of the 1977 annual conference, p. 449-451. Jan. 1977.

Edward Brown, Andy Thorne, "FireWire Audio Application utilizing high quality 96kHz 24bit I/O", Copyright Oxford Semiconductor 2004 © External—Free Release, Jul. 2004.

Wasson, "NVIDIA's SLI resurrects DPU teaming Kickin' it old school-with 32 pipes", www.techreport.com, Jun. 28, 2004. pp. 1-3, http://techreport.com/etc/2004q2/nvdia-sli/.

Weinand, "NVIDIA lance le SLI: une technologie multi-GDU", www.erenumerigue.fr, Jun. 29, 2004. pp. 1-7 http://www.erenumerique/fr/nvidia_lance_le_sli_une_technologie_multi_gpu-art-655-7.html.

Marc Prieur, "NVIDIA GeForce 6600 GT—HardWare.fr," Sep. 7, 2004, retrieved from http://www.hardware.fr/art/imprimer/514. pp. 1-23.

English translation of: Marc Prieur, "NVIDIA GeForce 6600 GT—HardWare.fr," Sep. 7, 2004, retrieved from http://www.hardware.fr.art/imprimer/514. pp. 1-24.

Scott Wasson, "NVIDIA's SLI Resurrects GPU Teaming: Kickin' It Old School—With 32 Pipes", Jun. 28, 2004, retrieved from http://techreport.com/articles.x/6931. 5 pgs.

PCT Search Report. Oct. 12, 2007.

Weinand, Lars. "NVIDIA lance le SLI: une technologie multi-GPU." Jun. 29, 2004, retrieved on Apr. 16, 2008 from: http://www.erenumerique.fr/nvidia_lance_le_sli_une_technologie_multi_gpu-art-655-1.html. pp. 1-12.

English Translation of: Weinand, Lars. "NVIDIA lance le SLI: une technologie multi-GPU." Jun. 29, 2004, retrieved on Apr. 16, 2008 from: http://www.erenumerique.fr/nvidia_lance_le_sli_une_technologie_multi_gpu-art-655-1.html. pp. 1-12.

Translated Search Report for ROC (Taiwan) Patent Application No. 094140479, provided as concise explanation of relevance of TW 570243 and TW 328392, date of completion Feb. 15, 2009.

* cited by examiner

PRIOR ART

CONNECTING GRAPHICS ADAPTERS

BACKGROUND OF THE INVENTION

1. Field of the Invention

One or more aspects of the invention generally relate to graphics processing, and more particularly to connecting graphics processors in a multi-processor graphics processing system.

2. Description of the Related Art

Figure 1:
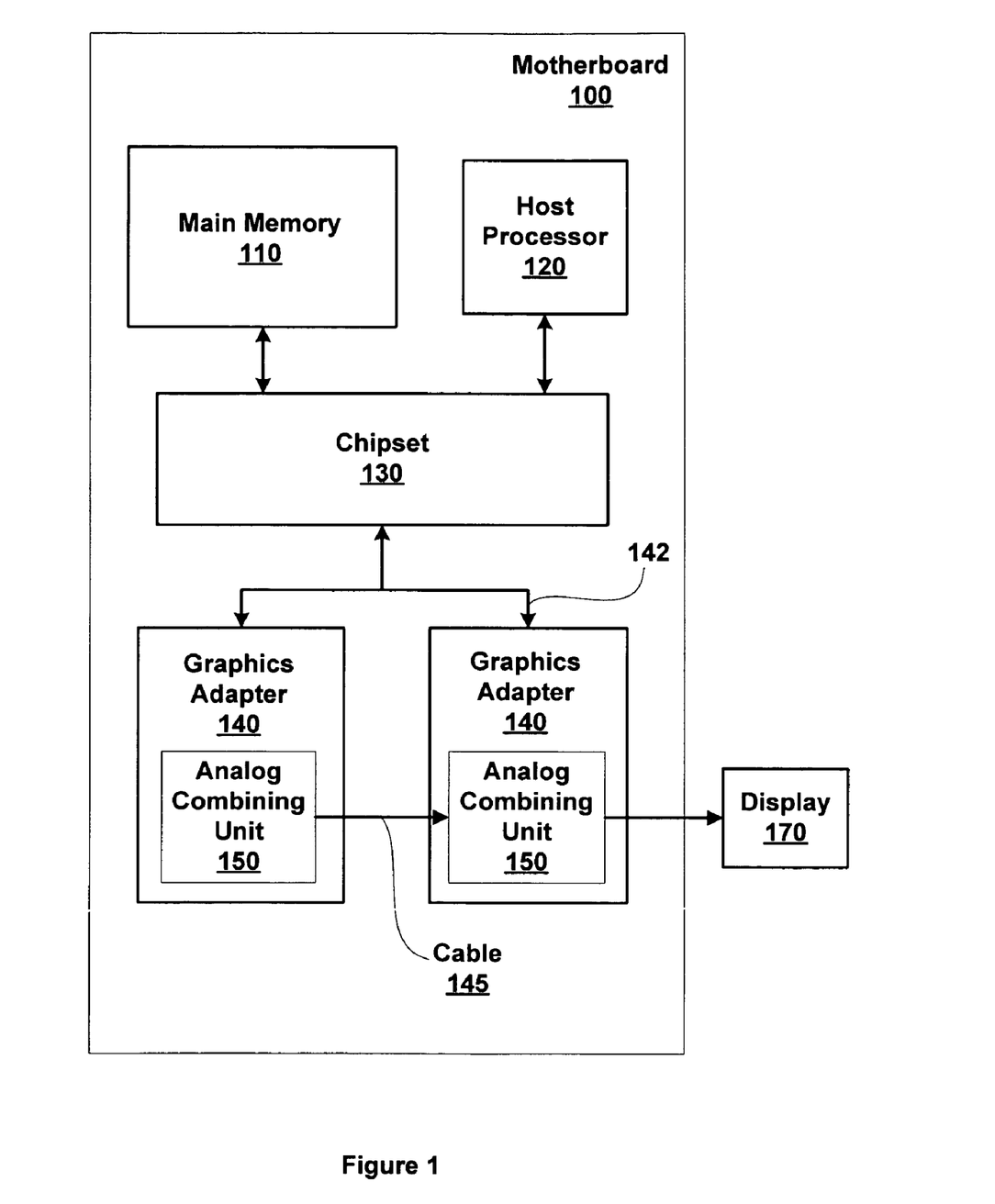
FIG. 1 is block diagram of an exemplary embodiment of a prior art motherboard for a multi-processor graphics processing system.

Conventional multi-processor graphics processing systems, such as 3dfx's VooDoo2™ graphics adapter product configured for scan line interleave (SLI) or Metabyte/Wicked 3D's parallel graphics configuration (PGC), increase graphics processing performance by using two or more graphics adapters. Motherboard 100, shown in FIG. 1, is an example of a conventional multi-processor graphics processing system. Motherboard 100 includes a host processor 120, a main memory 110, and a chipset 130 which is provides an industry standard interface, specifically peripheral component interface (PCI), to each graphics adapter 140. A first graphics adapter 140 and a second graphics adapter 140 are each coupled to motherboard 100 via connectors and instructions and data are broadcast from host processor 120 via PCI bus 142. The first graphics adapter 140 renders a first half, e.g. odd scan lines or the top half, of an image for display on a display 170 and the second graphics adapter 140 renders a second half of the image.

The first graphics adapter 140 converts the digital data for the first half of the image to the analog domain using a first digital to analog converter (DAC) within an analog combining unit 150 and outputs analog video signals to an analog combining unit 150 within the second graphics adapter 140 using a proprietary cable 145 configured to transfer analog signals. The second graphics adapter 140 converts the digital data for the second half of the image to the analog domain using a second DAC within another analog combining unit 150. The analog combining unit 150 within the second graphics adapter 140 combines the analog video signals received from the first graphics adapter 140 with analog video signals generated based on the second half of the image to produce an analog video output for the entire image. The analog video output for the entire image is output to display 170. Differences in video timing and DAC calibration between the first graphics adapter 140 and the second graphics adapter 140 introduces visual artifacts, such as tearing, during display of the entire image.

Accordingly, it is desirable to facilitate installation of two or more graphics adapters to produce an image free of artifacts resulting from video timing and DAC calibration differences.

SUMMARY OF THE INVENTION

The current invention involves new systems and methods for providing a dedicated digital interface between two or more graphics adapters. Surplus signals within an interface conforming to an interface specification are used to create the dedicated interface. The dedicated interface may connect the two or more graphics adapters using the interface via an interface device. The dedicated interface may directly connect the two or more graphics adapters through a portion of the interface, bypassing the interface device. Alternatively the dedicated interface may directly connect the two or more graphics adapters using dedicated connectors inserted into slots on a motherboard.

The dedicated interface may be used to transfer digital graphics data, such as texture maps, vertex data, shader data, shader programs, color buffer data, z buffer data, stencil buffer data, or the like. The dedicated interface may also be used to transfer synchronization signals. Two or more graphics adapters may be configured to generate an image for display on a single display device, improving rendering performance or image quality. Alternatively, two or more graphics adapters may be configured to generate images for display on multiple display devices.

Various embodiments of the invention include a multi-processor graphics processing system including a first graphics adapter, a second graphics adapter, and a dedicated connection. The first graphics adapter is configured to produce a displayable image. The second graphics adapter is configured to process graphics data and produce image data. The dedicated connection couples the first graphics adapter to the second graphics adapter using surplus signals within an interface conforming to an interface specification.

Various embodiments of a method of the invention of using surplus signals within an interface conforming to an interface specification to create a dedicated connection include processing graphics data to produce image data using a secondary graphics adapter, transmitting the image data from the secondary graphics adapter to a primary graphics adapter over at least a portion of the surplus signals, and generating a displayable image within the primary graphics adapter using the image data received from the secondary graphics adapter.

Various embodiments of the invention include a multi-processor graphics processing system including a first graphics adapter, a second graphics adapter, an interface device, and a secondary connection. The first graphics adapter is configured to produce a displayable image. The second graphics adapter is configured to process graphics data and produce image data. The interface device is coupled to the first graphics adapter by a first connector and coupled to the second graphics adapter by a second connector. The first interface and the second connector conform to an interface specification and form a primary connection. The secondary connection directly couples the first graphics adapter to the second graphics adapter.

Various embodiments of the invention include a multi-processor graphics processing system including a motherboard with conductive traces configured to provide a dedicated interface between a portion of a first connector and a portion of a second connector. The first connector is affixed to the motherboard and the second connector is affixed to the motherboard. The dedicated interface includes surplus signals within an interface conforming to an interface specification.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Surplus signals within an interface, including, but not limited to an industry standard interface specification, such as Accelerated Graphics Port™ (AGP), PCI-Express™, or the like, are used to create a dedicated interface between two or more graphics adapters. The dedicated interface may connect the two or more graphics adapters using the interface via an interface device. The dedicated interface may directly connect the two or more graphics adapters through a portion of the interface, bypassing the interface device. Alternatively the dedicated interface may directly connect the two or more graphics adapters using dedicated connectors inserted into slots on a motherboard. Therefore, N graphics adapters may be connected using the surplus signals.

Figure 2A:
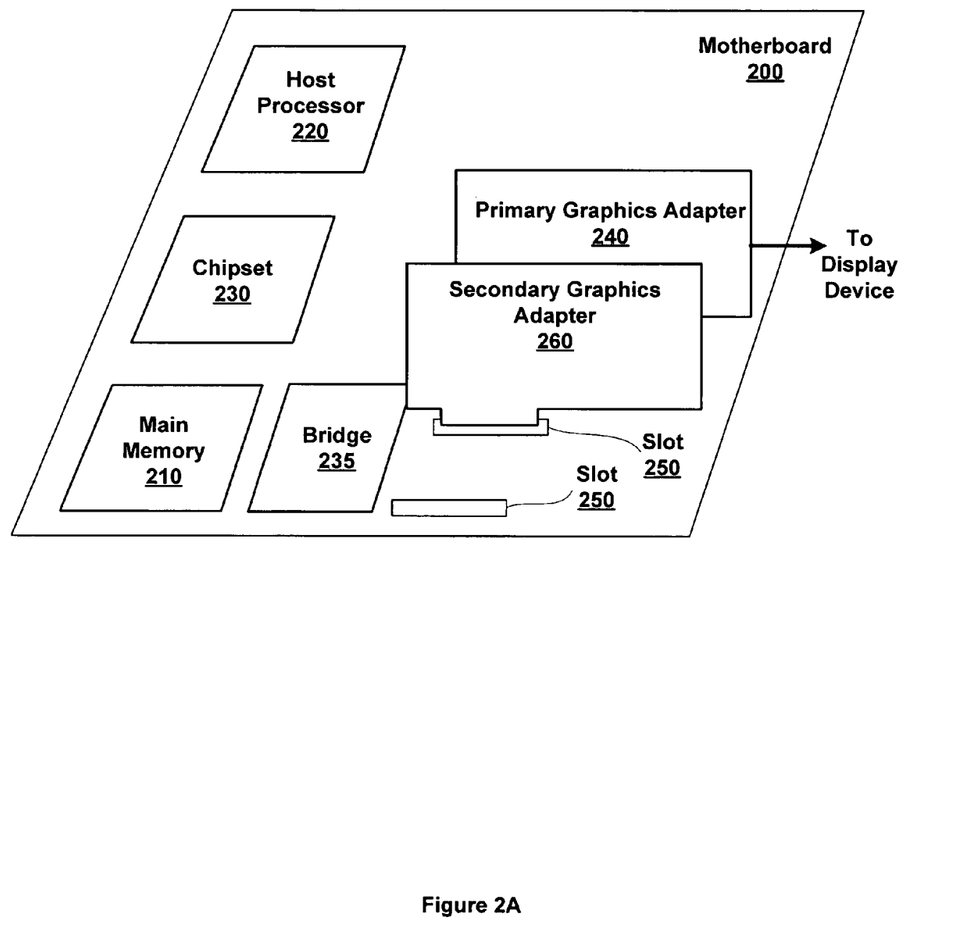
FIG. 2A is an exemplary embodiment of a motherboard for a multi-processor graphics processing system in accordance with one or more aspects of the present invention.

FIG. 2A is an exemplary embodiment of a motherboard 200 for a multi-processor graphics processing system in accordance with one or more aspects of the present invention. Motherboard 200 may be included within a desktop computer, server, laptop computer, palm-sized computer, tablet computer, game console, cellular telephone, computer based simulator, or the like. Motherboard 200 includes a host processor 220, a main memory 210, and a chipset 230 that is directly coupled to a bridge 235, as described in conjunction with FIG. 2B.

In some embodiments of motherboard 200, chipset 230 may include a system memory bridge and an input/output (I/O) bridge that may include several interfaces such as, Advanced Technology Attachment (ATA) bus, Universal Serial Bus (USB), PCI, or the like. Bridge 235 provides an interface between chipset 230 and a primary graphics adapter 240 and a secondary graphics adapter 260. Primary graphics adapter 240 is coupled to motherboard via a slot 250. Secondary graphics adapter 260 is coupled to motherboard via another slot 250. In some embodiments of the present invention, primary graphics adapter 240 is directly coupled to at least one display device and secondary graphics adapter 260 is directly coupled to at least one display device. In other embodiments of the present invention, only primary graphics adapter 240, is directly coupled to at least one display device. In those embodiments of the present invention, one or more secondary graphics adapters 260 provide image data to primary graphics adapter 240 via a dedicated connection, as described in conjunction with FIG. 2B.

Figure 2B:
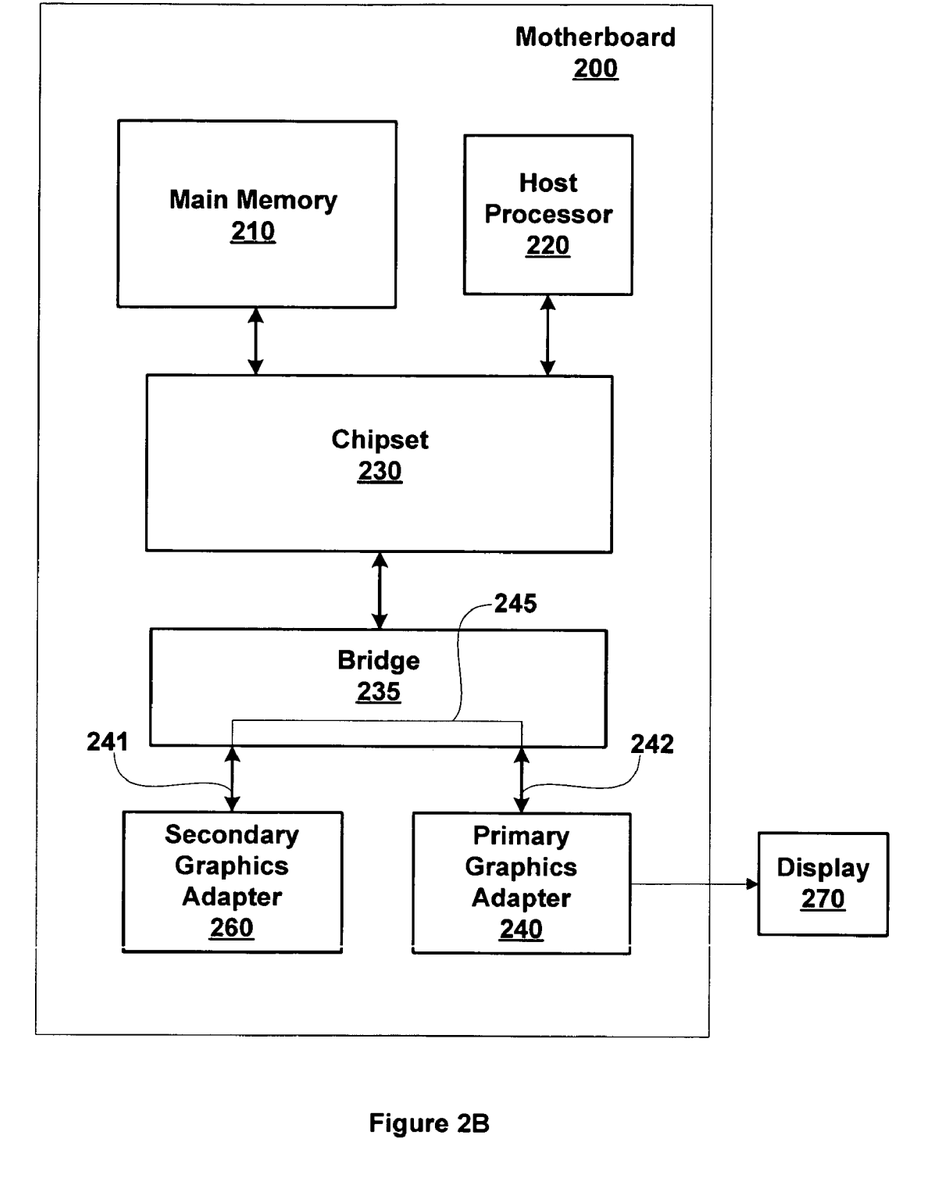
FIG. 2B is a block diagram of the exemplary embodiment of the motherboard for a multi-processor graphics processing system shown in FIG. 2A.

FIG. 2B is a block diagram of the exemplary embodiment of motherboard 200 shown in FIG. 2A. A first graphics adapter, primary graphics adapter 240, is plugged into a slot 250 and coupled to bridge 235 by an interface conforming to an interface specification, connection 242. A second graphics adapter, secondary graphics adapter 260 is plugged into another slot 250 and coupled to bridge 235 by an interface, typically conforming to the same interface specification as the interface that couples primary graphics adapter 240 to bridge 235, connection 242. An industry standard interface specification, such as PCI-Express™ includes signals for 32 bits, e.g., lanes, of data. In some embodiments of primary graphics adapter 240 and secondary graphics adapter 260, fewer than 32 bits of data are used. For example a graphics adapter may support 8 or 16 "lanes" or bits of data. The difference between the number of bits of data that are used by the graphics adapter and the number of bits provided by the interface specification are surplus signals. In other embodiments of the present invention, power and ground signals within the interface specification are redeployed for use as surplus signals.

A primary connection between primary graphics adapter 240 and one or more secondary graphics adapters 260 is provided by the interfaces via bridge 235. In some embodiments of the present invention, the primary connection couples primary graphics adapter 240 and one or more secondary graphics adapters 260 through bridge 235, chipset 230, and main memory 210 and data transfers between primary graphics adapter 240 and the one or more secondary graphics adapters 260 are controlled by host processor 220. A secondary connection 245 between primary graphics adapter 240 and secondary graphics adapter 260 is provided by the surplus signals of connection 241 and connection 242. At least a portion of connection 242 and connection 241 are connected within interface device, bridge 235 to form secondary connection 245 and facilitate the transfer of data between primary graphics adapter 240 and secondary graphics adapter 260. Secondary connection 245 provides an indirect dedicated connection between primary graphic adapter 240 and one or more secondary graphics adapters 260 without requiring attachment of a proprietary connector between primary graphic adapter 240 and one or more secondary graphics adapters 260. Furthermore, the positioning of primary graphics adapter 240 and secondary graphics adapter 260 on motherboard 200 is flexible, i.e., primary graphics adapter 240 and secondary graphics adapter 260 do not need to be positioned in adjacent slots 250 to be coupled to each other via secondary connection 245 within bridge 235.

In some embodiments of the present invention data, such as texture maps, written to primary graphics adapter 240 and secondary graphics adapter 260 by host processor 220 are broadcast to primary graphics adapter 240 and secondary graphics adapter 260, respectively, rather than being separately written to primary graphics adapter 240 and secondary graphics adapter 260. When the broadcast feature is used, the bandwidth consumed to transfer data to primary graphics adapter 240 and secondary graphics adapter 260 is effectively halved. Reducing the bandwidth consumed between host processor and primary graphics adapter 240 and secondary graphics adapter 260 may also improve system performance as well as graphics processing performance. Furthermore, when additional graphics adapters, also connected to primary graphics adapter 240 via bridge 235, are included in system 200 the broadcast feature further reduces the bandwidth compared with separately transferring data to each of the additional graphics adapters.

Primary graphics adapter 240 outputs image data to a display 270. Display 270 may include one or more display devices, such as a cathode ray tube (CRT), flat panel display, or the like. Secondary graphics adapter 260 may process a larger portion of an image than primary graphics adapter 240 and transfer the larger portion of the image to primary graphics adapter 240 via secondary connection 245, as described in conjunction with FIG. 5A. In some embodiments of the present invention, secondary graphics adapter 260 may process the entire image and primary graphics adapter 240 may receive the image data from secondary graphics adapter 260 via secondary connection 245. Processing of the image may be distributed between primary graphics adapter 240 and one or more secondary graphics adapters 260 based on the processing capability of each graphics adapter. Furthermore, synchronization signals may be transferred between secondary graphics adapter 260 and primary graphics adapter 240 using secondary connection 245.

Primary graphics adapter 240 and secondary graphics adapter 260 may each include dedicated memory which may be used to store graphics data, such as texture maps, image data, and program instructions. Primary graphics adapter 240 may write to or read from the dedicated memory within secondary graphics adapter 260 via secondary connection 245, as described in conjunction with FIG. 4. Likewise, secondary graphics adapter 240 may write to or read from the dedicated memory within primary graphics adapter 240 via secondary connection 245. In a conventional multi-processor graphics processing system, reading or writing between graphics adapters is controlled by a host processor, such as host processor 220. Using the surplus signals to provide a dedicated connection, such as secondary connection 245 between two or more graphics adapters facilitates efficient transfer of graphics data and synchronization signals between the two or more graphics adapters while reducing system bandwidth. Furthermore, users can easily install each graphics adapter as desired to improve rendering performance in terms of image quality or rendering speed. For example, two or more graphics adapters may be used to render images with improved image quality or two or more graphics adapters may be used to render images at a higher frame rate.

Figure 3A:
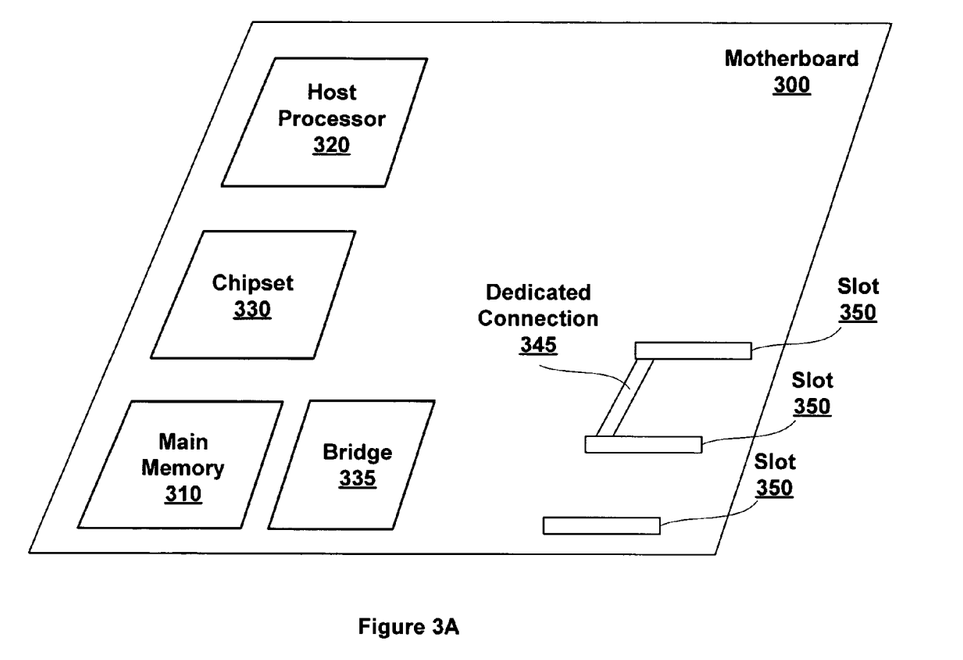
FIG. 3A is another exemplary embodiment of a motherboard for a multi-processor graphics processing system in accordance with one or more aspects of the present invention.

FIG. 3A is another exemplary embodiment of a motherboard 300 for a multi-processor graphics processing system in accordance with one or more aspects of the present invention. Motherboard 300 includes the elements shown in motherboard 200 of FIG. 2A with a dedicated connection 345 directly coupling two slots 350. Host processor 320, chipset 330, main memory 310, bridge 335, and slots 350 within motherboard 300 correspond to host processor 220, chipset 230, main memory 210, bridge 235, and slots 250 within motherboard 200.

Similar to slots 250 in FIG. 2A, each slot 350 may couple a graphics adapter, such as primary graphics adapter 240 or secondary graphics adapter 260 to motherboard 300. Just as secondary connection 245 may be used to transfer graphics data, synchronization signals, or image data between graphics adapters installed in slots 250 of motherboard 200, a dedicated connection 345 may also be used to transfer graphics data, synchronization signals, or image data between graphics adapters installed in slots 350. However, because dedicated connection 345 provides a direct connection between slots 350, the graphics data, synchronization signals, or image data transferred between graphics adapters installed in slots 350 does not pass through bridge 335. Dedicated connection 345 may be a set of traces fabricated as part of motherboard 300 connecting surplus signals within an interface that is routed from bridge 335 to each 350.

Figure 3B:
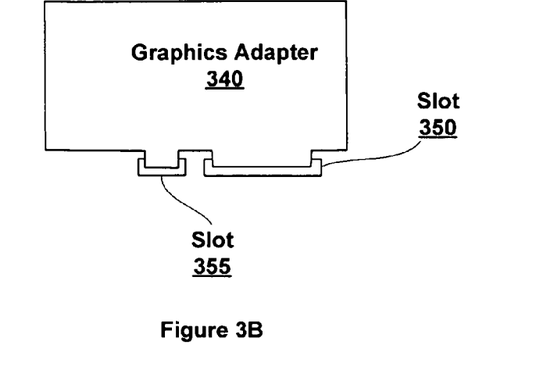
FIG. 3B is an exemplary embodiment of a graphics adapter configuration in accordance with one or more aspects of the present invention.

FIG. 3B is an exemplary embodiment of a graphics adapter configuration in accordance with one or more aspects of the present invention. A graphics adapter 340 differs from primary graphics adapter 240 or secondary graphics adapter 260 in that it has a second "finger" used to connect to a second slot, slot 355. Signals included in a dedicated connection are routed through the second finger to slot 355 to couple two or more graphics adapters.

Figure 3C:
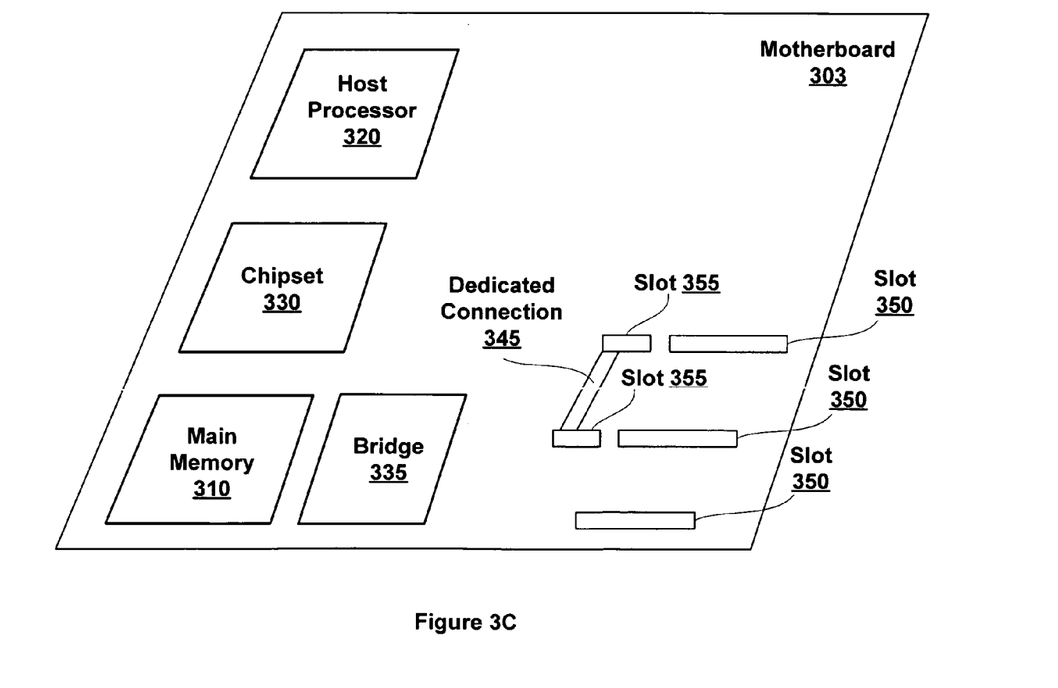
FIG. 3C is another exemplary embodiment of a motherboard for a multi-processor graphics processing system in accordance with one or more aspects of the present invention.

FIG. 3C is another exemplary embodiment of a motherboard for a multi-processor graphics processing system in accordance with one or more aspects of the present invention. Dedicated connection 345 is provided by slots 355 and a set of traces connecting slots 355 that are fabricated as part of motherboard 303. In some embodiments of the present invention, additional slots 355 may be connected by additional dedicated connections 345. A primary connection using an interface conforming to an interface specification is coupled to graphics adapter 340 via slot 350 and a secondary connection, e.g., dedicated connection 345, is coupled to graphics adapter 340 via slot 355.

Figure 3D:
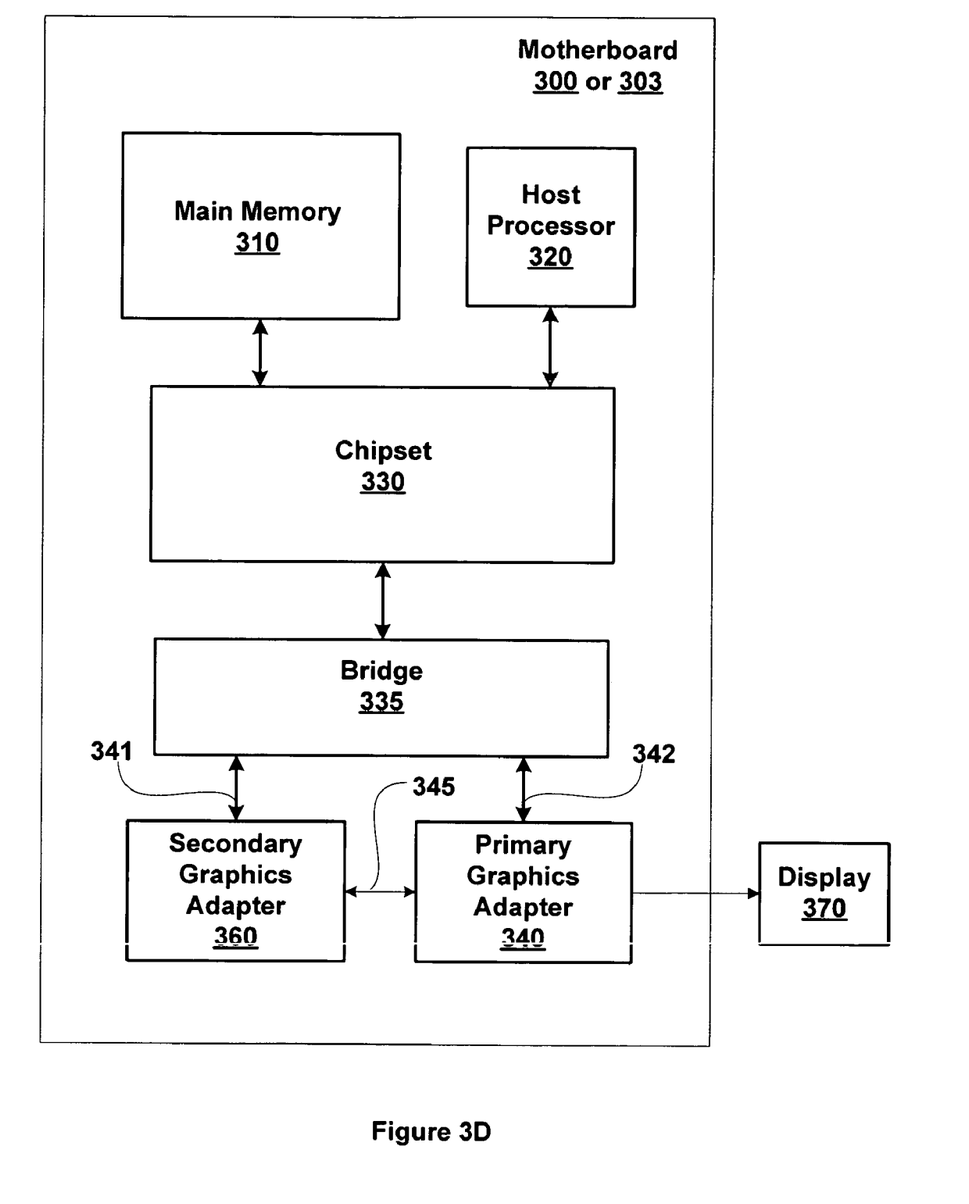
FIG. 3D is a block diagram of the exemplary embodiment of the motherboards shown in FIGS. 3A and 3C.

FIG. 3D is a block diagram of the exemplary embodiment of the motherboard 300 or motherboard 303 shown in FIGS. 3A and 3C, respectively. A primary connection between primary graphics adapter 340 and one or more secondary graphics adapters 360 is provided by the interfaces via bridge 335. In some embodiments of the present invention, the primary connection couples primary graphics adapter 340 and one or more secondary graphics adapters 360 through connection 341, connection 342, bridge 335, chipset 330, and main memory 310 and data transfers between primary graphics adapter 340 and the one or more secondary graphics adapters 360 are controlled by host processor 320. In other embodiments of the present invention, the primary connection couples primary graphics adapter 340 and one or more secondary graphics adapters 360 through connection 341, connection 342, and bridge 335.

Secondary connection 345 provides a direct dedicated connection between primary graphic adapter 340 and one or more secondary graphics adapters 360 without requiring attachment of a proprietary connector between primary graphic adapters 340 and one or more secondary graphics adapters 360. Furthermore, the positioning of primary graphics adapter 340 and secondary graphics adapter 360 on motherboard 303 is flexible, i.e., primary graphics adapter 340 and secondary graphics adapter 360 do not need to be positioned in adjacent slots 350 and 355 to be coupled to each other via secondary connection 345 within bridge 335. For example a slot 355 may be paired with each slot 350 and a dedicated connection 345 may connect each slot 355 to the other slots 355. Therefore, users can easily install each graphics adapter as desired to improve rendering performance in terms of image quality or rendering speed.

As previously described in conjunction with FIG. 2B, the broadcast feature may be used to transfer data from main memory 310 to primary graphics adapter 340 and secondary graphics adapter 360, effectively halving the system bandwidth. Primary graphics adapter 340 may write to or read from the dedicated memory within secondary graphics adapter 360 via dedicated connection 345, without passing transactions through bridge 335. Likewise, secondary graphics adapter 360 may write to or read from the dedicated memory within primary graphics adapter 240 via dedicated connection 345.

Primary graphics adapter 340 outputs image data to a display 370. Display 370 may include one or more display devices, such as a cathode ray tube (CRT), flat panel display, or the like. In some embodiments of the present invention, secondary graphics adapter 360 is coupled to one or more display devices. Secondary graphics adapter 360 may process a larger portion of an image than primary graphics adapter 340 and transfer the larger portion of the image to primary graphics adapter 340 via dedicated connection 345, as described in conjunction with FIG. 5A. In some embodiments of the present invention, secondary graphics adapter 360 may process the entire image and primary graphics adapter 340 may receive the image data from secondary graphics adapter 360 via dedicated connection 345. Processing of the image may be distributed between primary graphics adapter 340 and one or more secondary graphics adapters 360 based on the processing capability of each graphics adapter. Furthermore, synchronization signals may be transferred between secondary graphics adapter 360 and primary graphics adapter 340 using dedicated connection 345.

Figure 4:
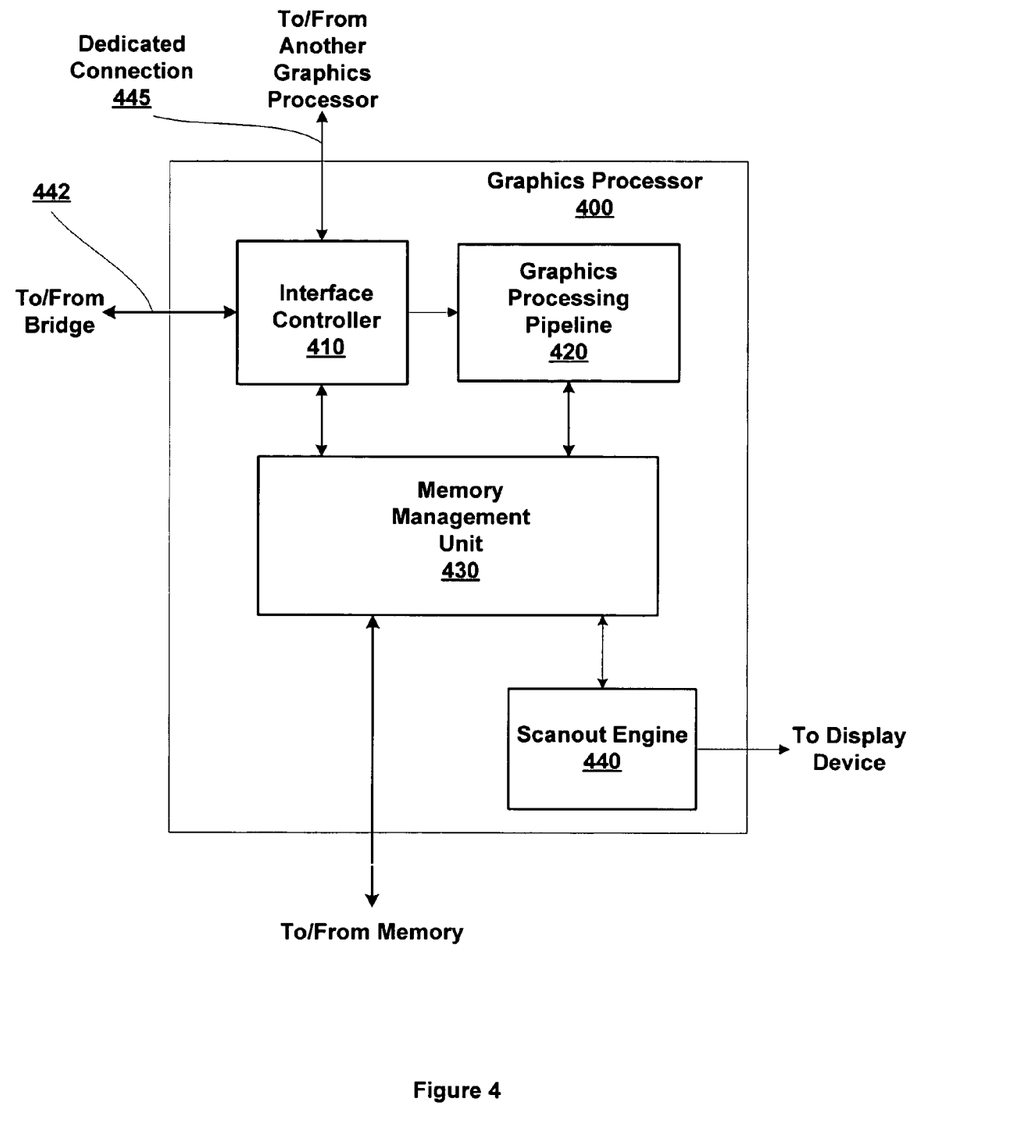
FIG. 4 is an exemplary embodiment of a graphics processor in accordance with one or more aspects of the present invention.

FIG. 4 is an exemplary embodiment of a graphics processor 400 in accordance with one or more aspects of the present invention. Graphics processor 400 may be included within a graphics adapter, such as primary graphics adapters 240 or 340 or secondary graphics adapters 260 or 360. Graphics processor 400 includes an interface controller 410 that provides signals to and from switch 235 or switch 335 via a primary connection, connection 442. Connection 442 corresponds to connections 241, 242, 341, and 342, which conform to an interface specification and are coupled to a motherboard via slot 250 or slot 350. Interface controller 410 also provides signals to and from another graphics processor, such as graphics processor 400 via a secondary connection, dedicated connection 445.

In some embodiments of the present invention, dedicated connection 445 includes surplus signals from the interface. In other embodiments of the present invention, dedicated connection 445 includes signals that are not within the interface specification. Dedicated connection 445 may provide a direct connection between two or more graphics adapters via signals routed through a slot used for the interface, such as slot 250 or 350, or through a dedicated slot, such as slot 355. Alternatively, dedicated connection 445 may provide an indirect connection between two or more graphics adapters through an interface device, such as bridge 235 or 335.

Interface controller 410 outputs program instructions and data to graphics processing pipeline 420 for processing. Interface controller 410, graphics processing pipeline 420, and scanout engine 440 read and write requests to memory management unit 430 to access memory included in the graphics adapter. Memory management unit 430 may output read and write requests to interface controller 410 when the data to be read or written is stored (or will be stored) in memory outside of the graphics adapter, such as system memory. Memory management unit 430 may also output read and write requests to interface controller 410 when the data to be read or written is stored (or will be stored) in memory on another graphics adapter that is coupled to graphics processor 400 via dedicated connection 445. Therefore, graphics data, such as image data or texture maps stored in memory on one graphics adapter may be read from or written to by another graphics adapter using dedicated connection 445. Scanout engine 440 outputs displayable image data to one or more display devices. Alternatively, graphics processor 400 is not directly coupled to a display device and image data is output by graphics processor 400 to memory included in the graphics adapter, system memory, memory included in another graphics adapter, or the like.

Figure 5A:
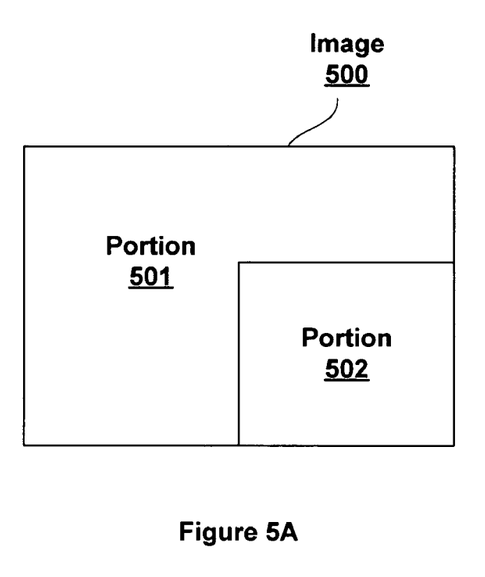
FIG. 5A illustrates an image processed using multiple graphics adapters in accordance with one or more aspects of the present invention.

FIG. 5A illustrates an image 500 processed using multiple graphics adapters in accordance with one or more aspects of the present invention. A first portion of image 550, portion 501 may be processed by a first graphics adapter, such as primary graphics adapter 260 or 360 to produce image data for portion 501. A second portion of image 550, portion 502 may be processed by another graphics adapter, such as secondary graphics adapter 240 or 340 to produce image data for portion 502. Processing of the image may be distributed between primary graphics adapter 240 and one or more secondary graphics adapters 260 based on the processing capability of each graphics adapter. The processing capability may include performance characteristics such as frame rate, primitives rendered per second, texture rendering speed, image resolution, or the like. The processing capability may include image quality characteristics such as trilinear filtered texture mapping, antialiasing, multiple light sources, or the like.

Although portion 501 and portion 502 are shown as rectangular regions, those skilled in the art will recognize that other regions of other two-dimensional shapes may be used. Furthermore, additional portions may be included within image 500 and each portion may be processed by a single graphics adapter and graphics adapters may process multiple portions. The portions are combined together to produce a displayable image, such as image 500. In some embodiments of the present invention graphics operations such as blending, stencil, or the like, are used to combine the portions to produce the final image.

Figure 5B:
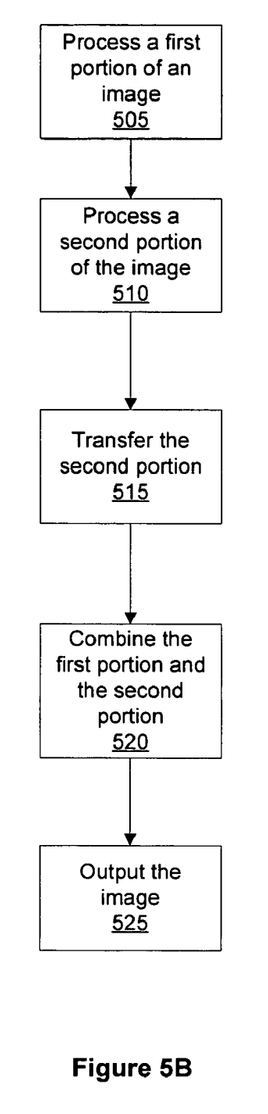
FIG. 5B is an exemplary embodiment of a method of generating an image using multiple graphics adapters in accordance with one or more aspects of the present invention.

FIG. 5B is an exemplary embodiment of a method of generating a displayable image, such as image 500, using multiple graphics adapters in accordance with one or more aspects of the present invention. In step 505 a first portion of an image, such as portion 501, is processed by a first graphics adapter, such as primary graphics adapter 260 or 360 to produce image data for the first portion of the image. In step 510 a second portion of the image is processed by another graphics adapter, such as secondary graphics adapter 240 or 340 to produce image data for the second portion of the image, such as portion 502. Although steps 505 and 510 are shown as sequential, steps 505 and 510 may be completed in parallel or step 510 may precede step 505.

In step 515 the image data for second portion of the image is transferred from the second graphics adapter to the first graphics adapter, using a write operation over a secondary connection, such as secondary connection 245 or dedicated connection 345. In step 520 the first graphics adapter combines the image data for the first portion of the image and the image data for the second portion of the image to produce a displayable image. In step 525 the first graphics adapter outputs the displayable image to one or more display devices. In some embodiments of the present invention, the displayable image is stored in memory on the first graphics adapter or is stored in system memory.

Figure 5C:
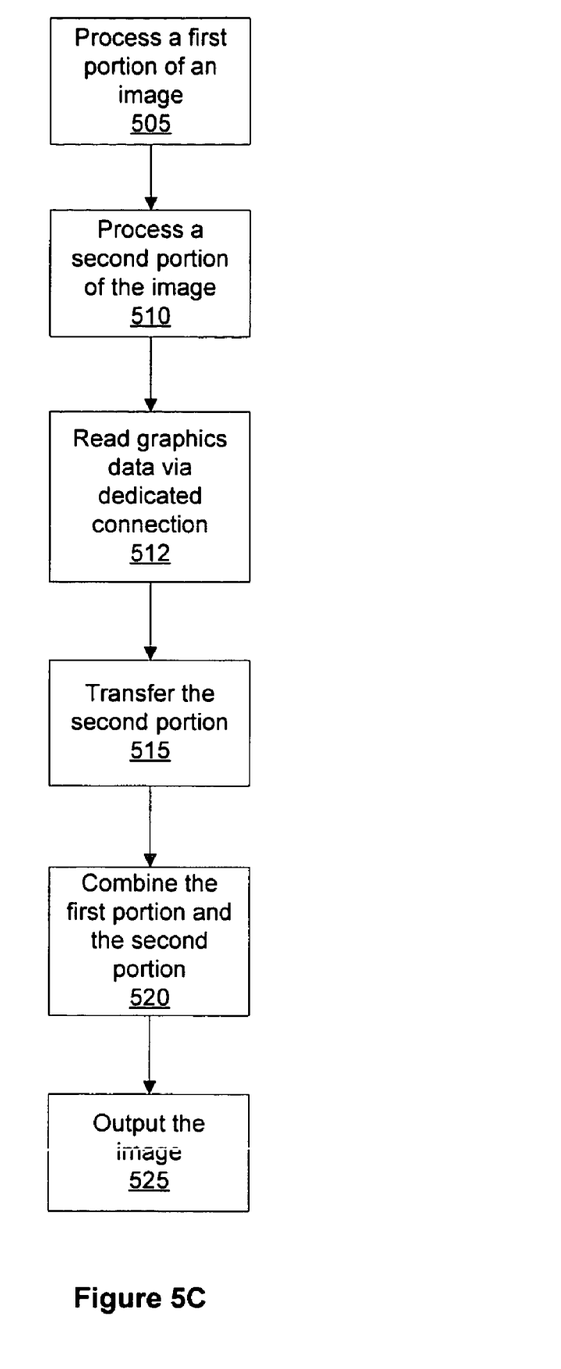
FIG. 5C is an exemplary embodiment of another method of generating an image using multiple graphics adapters in accordance with one or more aspects of the present invention.

FIG. 5C is an exemplary embodiment of another method of generating a displayable image, such as image 500, using multiple graphics adapters in accordance with one or more aspects of the present invention. Steps 505 and 510 are completed as previously described in conjunction with FIG. 5B. In step 512 graphics data is read from memory on another graphics adapter using the secondary connection, such as secondary connection 245 or dedicated connection 345. Graphics data may include texture maps, vertex data, shader data, shader program instructions, color buffer data, z buffer data, stencil buffer data, texture map data, or the like. For example, the first graphics adapter may read graphics data from memory within the second graphics adapter to complete processing of the first portion of the image. Likewise, the second graphics adapter may read graphics data from memory within the first graphics adapter to complete processing of the second portion of the image. Steps 515, 520 and 525 are completed as previously described in conjunction with FIG. 5B.

In a conventional graphics system, when graphics data is not stored in local memory, i.e., memory on the graphics adapter, the graphics adapter reads the graphics data from system memory, using system bandwidth and slowing processing due to the higher latency for reads of system memory compared with reads of local memory. Therefore, graphics processing performance may be improved when graphics data is accessible using a secondary connection and the available system bandwidth may be increased.

Figure 5D:
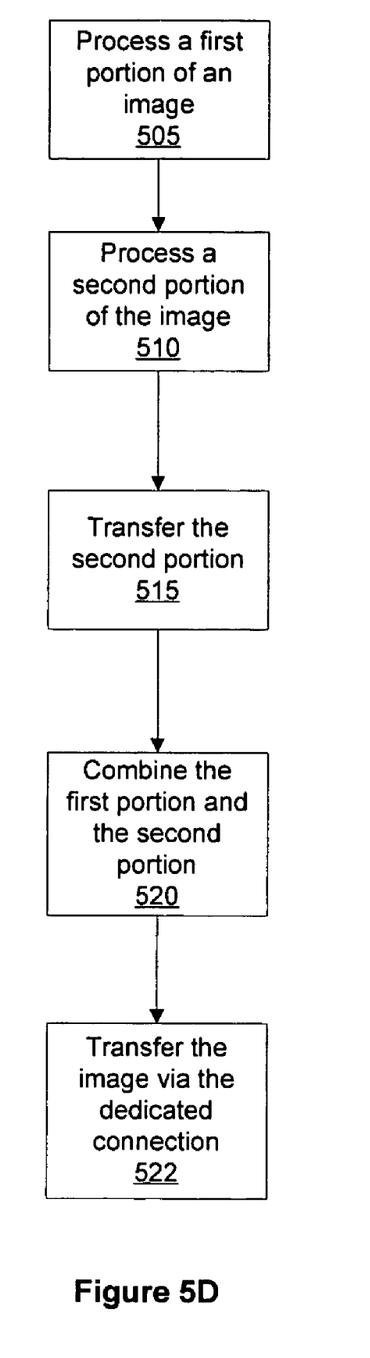
FIG. 5D is another exemplary embodiment of a method of generating an image using multiple graphics adapters in accordance with one or more aspects of the present invention.

FIG. 5D is another exemplary embodiment of a method of generating a displayable image, such as image 500, using multiple graphics adapters in accordance with one or more aspects of the present invention. Steps 505, 510, 515, and 520 are completed as previously described in conjunction with FIG. 5B. In some embodiments of the present invention, step 512, described in conjunction with FIG. 5C, is also completed. In step 522 the displayable image or a portion of the displayable image is written from the first graphics adapter to the second graphics adapter via the secondary connection, such as secondary connection 245 or dedicated connection 345. Specifically, the first graphics adapter may write displayable image data to memory within the second graphics adapter so the image data may be accessed as a texture map to produce another image. Similarly, the second graphics adapter may write graphics data, such as vertex data, shader data, shader program instructions, color buffer data, z buffer data, stencil buffer data, texture map data, or the like, to memory within the first graphics adapter to transfer the first portion of the image data to the first graphics adapter.

Surplus signals within an interface conforming to an interface specification may be used to create a dedicated interface such as, dedicated connection 345 or secondary connection 245. In one embodiment of the present invention, the dedicated interface connects two or more graphics adapters using the interface via an interface device. In another embodiment of the present invention, the dedicated interface directly connects the two or more graphics adapters through a portion of the interface, bypassing the interface device. The portion of the interface may be directly connected through traces integrated onto a motherboard including the two or more graphics adapters. In yet another embodiment of the present invention, the dedicated interface directly connects the two or more graphics adapters using dedicated connectors inserted into slots, such as slots 355, on a motherboard. The dedicated interface facilitates installation of two or more graphics adapters with a functionally reliable direct connection between the two or more graphics adapters.

The dedicated interface may be used to transfer graphics data, such as texture maps, vertex data, shader data, shader program instructions, color buffer data, z buffer data, stencil buffer data, or the like, between graphics adapters. The dedicated interface may also be used to transfer synchronization signals. Two or more graphics adapters may be configured to generate an image for display on a single display device, improving rendering performance or image quality. Alternatively, two or more graphics adapters may be configured to generate images for display on multiple display devices.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of using surplus signals within an interface conforming to an interface specification to create a dedicated connection, comprising:
   processing graphics data to produce image data using a secondary graphics adapter;
   transmitting the image data from the secondary graphics adapter to a primary graphics adapter over at least a portion of the surplus signals, wherein the surplus signals are unused signals of a first interface between a bridge device and the primary graphics adapter and a second interface between the bridge device and the secondary graphics adapter, wherein the unused signals are specified by the interface specification to support one or more of data, power, and ground signals of the first interface and the second interface, and the surplus signals are redeployed to form the dedicated connection coupling the primary graphics adapter to the secondary graphics adapter, the dedicated connection bypassing the bridge device; and
   generating a displayable image within the primary graphics adapter using the image data received from the secondary graphics adapter.

2. The method of claim 1, wherein the dedicated connection directly couples the secondary graphics adapter to the primary graphics adapter through conductive traces that connect a portion of a first connector to a portion of a second connector, the first connector coupling the bridge device to the primary graphics adapter and the second connector coupling the bridge device to the secondary graphics adapter.

3. The method of claim 1, further comprising transmitting graphics data from the secondary graphics adapter to the primary graphics adapter.

4. The method of claim 3, wherein the graphics data includes at least one of texture map data, color buffer data, z buffer data, and stencil buffer data.

5. The method of claim 3, wherein the graphics data includes at least one of vertex data, shader data, and shader program instructions.

6. The method of claim 1, further comprising transmitting graphics data from the primary graphics adapter to the secondary graphics adapter.

7. The method of claim 6, wherein the graphics data includes at least one of texture map data, color buffer data, z buffer data, and stencil buffer data.

8. The method of claim 6, wherein the graphics data includes at least one of vertex data, shader data, and shader program instructions.

9. The method of claim 1, further comprising outputting the displayable image to a display device.

10. The method of claim 1, wherein a first portion of the displayable image is produced by the primary graphics adapter and a second portion of the displayable image is produced by the secondary graphics adapter.

11. The method of claim 1, further comprising broadcasting graphics data to the primary graphics adapter and the secondary graphics adapter using the first interface and the second interface.

12. A multi-processor graphics processing system, comprising:
a first graphics adapter configured to produce a displayable image based on image data;
a second graphics adapter configured to process graphics data and produce at least a first portion of the image data from the graphics data;
an interface device coupled to the first graphics adapter by a first interface and coupled to the second graphics adapter by a second interface, the first interface and the second interface conforming to an interface specification and forming a primary connection; and
a dedicated connection bypassing the interface device and coupling the first graphics adapter to the second graphics adapter using surplus signals within the primary connection, wherein the surplus signals are unused signals of the first interface and the second interface that are specified by the interface specification to support one or more of data, power, and ground signals of the primary connection, and the unused signals are redeployed to form the dedicated connection.

13. The system of claim 12, wherein the dedicated connection directly couples the first graphics adapter to the second graphics adapter through conductive traces that connect a portion of a first connector to a portion of a second connector, the first connector coupling the interface device to the first graphics adapter and the second connector coupling the interface device to the second graphics adapter.

14. The system of claim 12, wherein the first graphics adapter and the second graphics adapter are positioned in non-adjacent slots on a printed circuit board.

15. The system of claim 12, wherein the dedicated connection is configured to transmit a second portion of the image data from the first graphics adapter to the second graphics adapter.

16. The system of claim 12, wherein the dedicated connection is configured to transmit the first portion of the image data from the second graphics adapter to the first graphics adapter.

17. The system of claim 12, wherein a first portion of the displayable image is produced by the first graphics adapter and a second portion of the displayable image is produced by the second graphics adapter.

18. The system of claim 12, wherein the first graphics adapter accesses the dedicated connection through a first connector and the second graphics adapter accesses the dedicated connection through a second connector, where the first and the second connector are each affixed to a printed circuit board that includes the interface device.

19. The system of claim 12, wherein the interface device broadcasts the graphics data to the first graphics adapter and the second graphics adapter through the first interface and the second interface.

20. A multi-processor graphics processing system, comprising a motherboard including conductive traces configured to provide a dedicated interface between a portion of a first connector and a portion of a second connector wherein the first connector is affixed to the motherboard and the second connector is affixed to the motherboard, and the dedicated interface includes surplus signals within an first interface and a second interface that each conform to an interface specification, the surplus signals being unused signals that are specified by the interface specification to support one or more of data, power, and ground signals;
the first interface including first conductive traces coupling the first connector to a device on the motherboard; and
the second interface including second conductive coupling the second connector to the device on the motherboard, wherein the dedicated interface between the portion of the first connector and the portion of the second connector bypasses the device.

21. The system of claim 20, wherein the interface specification is an industry standard interface specification.

22. The system of claim 21, wherein the industry standard interface specification is PCI-Express™.

23. The system of claim 20, further comprising:
a first graphics adapter coupled to the first connector and configured to produce an image based on image data; and
a second graphics adapter configured to process graphics data and produce at least a first portion of the image data from the graphics data.

24. The system of claim 20, wherein the device on the motherboard is an interface device configured to provide a secondary connection between the first connector and the second connector, the secondary connection conforming to the interface specification.

25. A multi-processor graphics processing system, comprising a motherboard including:
a first connector that is affixed to the motherboard and configured to provide a first slot to accept a first adapter card;
a second connector that is affixed to the motherboard and configured to provide a second slot to accept a second adapter card;
a third connector that is affixed to the motherboard and configured to provide the first slot;
a fourth connector that is affixed to the motherboard and configured to provide the second slot; and
conductive traces configured to provide a dedicated interface between the first connector and the second connector, wherein the dedicated interface includes surplus signals within an interface conforming to an interface specification that provides a first interface between the third connector and a device affixed to the motherboard and a second interface between the fourth connector and the device affixed to the motherboard, and the dedicated interface bypasses the device, the surplus signals being unused signals that are specified by the interface specification to support one or more of data, power, and ground signals.

26. The system of claim 25, wherein the device affixed to the motherboard is an interface device that is separately coupled to the third connector and the fourth connector to provide a primary connection that includes used signals of the interface conforming to the interface specification.

27. The system of claim 25, further comprising:
a first graphics adapter coupled to the first connector and the third connector and configured to produce an image based on image data; and
a second graphics adapter coupled to the second connector and the fourth connector and configured to process graphics data and produce at least a first portion of the image data from the graphics data.

* * * * *